US012222365B2

United States Patent
Shigekawa et al.

(10) Patent No.: US 12,222,365 B2
(45) Date of Patent: Feb. 11, 2025

(54) OPTICAL OUTPUT SYSTEM, MEASUREMENT SYSTEM, OPTICAL PUMP-PROBE SCANNING TUNNELING MICROSCOPE SYSTEM, COMPUTING DEVICE, PROGRAM, AND COMPUTING METHOD

(71) Applicant: Gtheranostics Co., Ltd., Tokyo (JP)

(72) Inventors: Hidemi Shigekawa, Tsukuba (JP); Osamu Takeuchi, Tsukuba (JP); Zi-han Wang, Tsukuba (JP)

(73) Assignee: Gtheranostics Co., Ltd., Tokyo (JP)

( * ) Notice: Subject to any disclaimer, the term of this patent is extended or adjusted under 35 U.S.C. 154(b) by 664 days.

(21) Appl. No.: 17/312,844

(22) PCT Filed: Nov. 29, 2019

(86) PCT No.: PCT/JP2019/046904
§ 371 (c)(1),
(2) Date: Oct. 6, 2021

(87) PCT Pub. No.: WO2020/121856
PCT Pub. Date: Jun. 18, 2020

(65) Prior Publication Data
US 2022/0026462 A1 Jan. 27, 2022

(30) Foreign Application Priority Data
Dec. 13, 2018 (JP) .................. 2018-233878

(51) Int. Cl.
*G01Q 30/02* (2010.01)
*G01N 21/01* (2006.01)
(Continued)

(52) U.S. Cl.
CPC ............ *G01Q 30/025* (2013.01); *G01N 21/01* (2013.01); *G01N 21/17* (2013.01); *G01N 21/636* (2013.01); *G01Q 60/10* (2013.01); *G01Q 60/12* (2013.01)

(58) Field of Classification Search
CPC ............... G01N 27/223; G01N 27/226; G01N 27/227; G01N 27/228; G01N 21/01;
(Continued)

(56) References Cited

U.S. PATENT DOCUMENTS

| 2010/0088787 A1 | 4/2010 | Shigekawa |
| 2014/0240710 A1 | 8/2014 | Shigekawa |
| 2014/0253911 A1 | 9/2014 | Nakanishi et al. |

FOREIGN PATENT DOCUMENTS

| JP | 2008-139028 A | 6/2008 |
| JP | 2013-032993 A | 2/2013 |

(Continued)

OTHER PUBLICATIONS

Notice of Reasons for Refusal for the corresponding JP application No. 2020-559151 mailed Aug. 17, 2021 and English translation thereof.

(Continued)

*Primary Examiner* — Tri T Ton
(74) *Attorney, Agent, or Firm* — Muncy, Geissler, Olds & Lowe, P.C.

(57) ABSTRACT

An optical output system includes: a first laser that outputs first light which is a pulse laser in response to input of a first signal; a second laser that outputs second light which is a pulse laser in response to input of a second signal; and an arithmetic unit that inputs the first signal and the second signal to the first laser and the second laser, wherein the arithmetic unit repeatedly inputs the first signal and the second signal with switching a variable delay value, which (Continued)

is a difference between a timing to input the first signal to the first laser and a timing to input the second signal to the second laser, in a plurality of ways.

20 Claims, 11 Drawing Sheets

(51) Int. Cl.
*G01N 21/17* (2006.01)
*G01N 21/63* (2006.01)
*G01Q 60/10* (2010.01)
*G01Q 60/12* (2010.01)

(58) Field of Classification Search
CPC ......... G01N 21/636; G01N 2021/1789; G01N 2021/637; G01N 21/17; G01N 21/39; G01N 21/55; G01Q 30/02; G01Q 30/025; G01Q 60/10; G01Q 60/12; E04H 17/04; F41H 11/00; G08B 25/14
USPC .......................................................... 356/300
See application file for complete search history.

(56) References Cited

FOREIGN PATENT DOCUMENTS

| JP | 2014-175442 A | 9/2014 | |
|---|---|---|---|
| JP | 2018-175999 A | 11/2018 | |
| JP | 2018-179506 A | 11/2018 | |
| WO | WO-2013018813 A1 * | 2/2013 | ......... G01N 21/1717 |

OTHER PUBLICATIONS

The extended European search report of the corresponding EP application No. 19895256.6 mailed Jul. 13, 2022.
Yasuhiko Terada et al., "Real-space imaging of transient carrier dynamics by nanoscale pump-probe microscopy" Nature Photonics, vol. 4, No. 12, Oct. 24, 2010, p. 869-874.
International Search Report for PCT/JP2019/046904 dated Feb. 4, 2020 and English translation thereof.

* cited by examiner

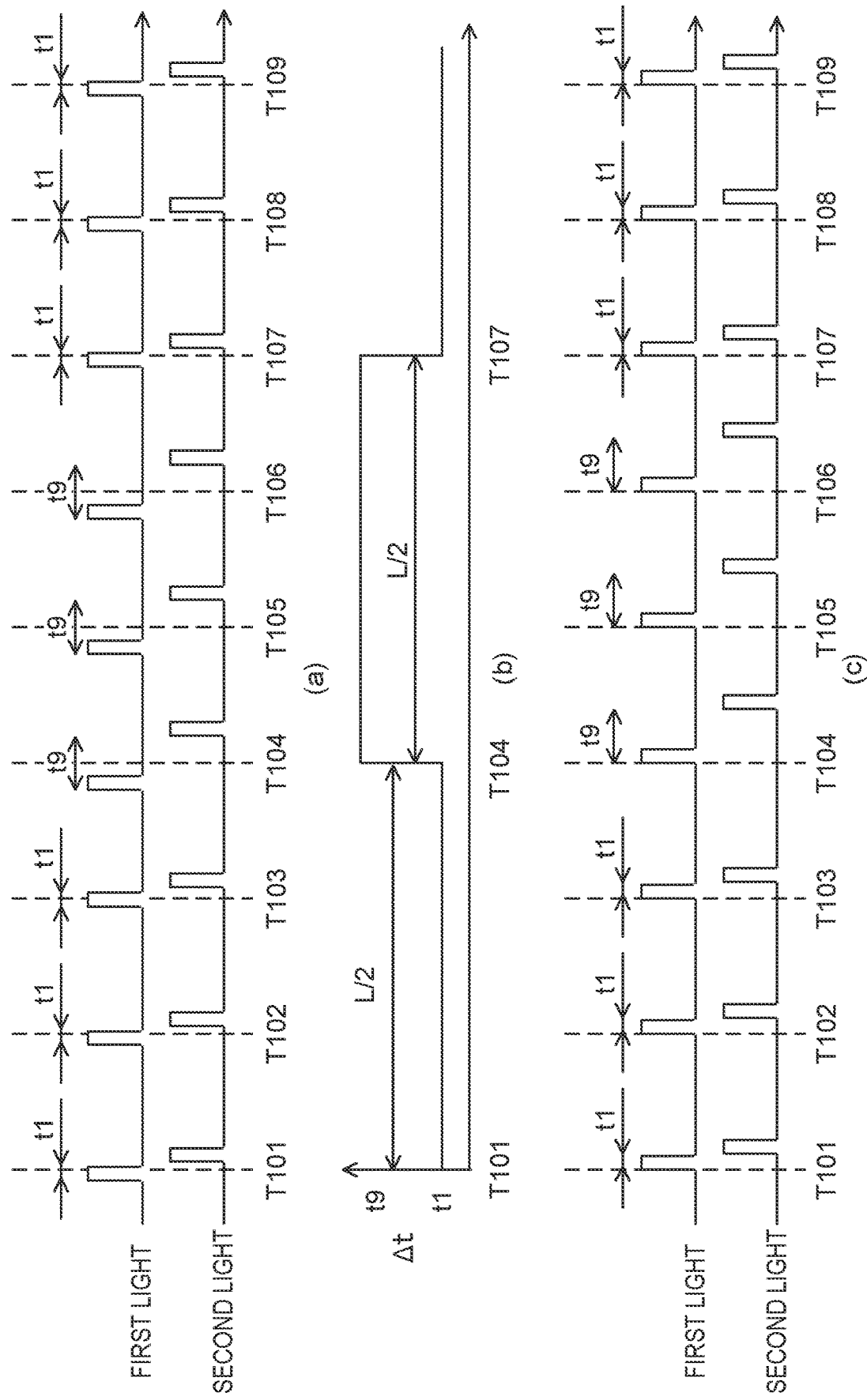

OPTICAL OUTPUT SYSTEM, MEASUREMENT SYSTEM, OPTICAL PUMP-PROBE SCANNING TUNNELING MICROSCOPE SYSTEM, COMPUTING DEVICE, PROGRAM, AND COMPUTING METHOD

TECHNICAL FIELD

The present invention relates to an optical output system, a measuring system, an optical pump-probe scanning tunneling microscope system, an arithmetic unit, and a program.

BACKGROUND ART

Regarding a pump-probe method used for observation of living things and a research of detailed physical properties of materials, measurements are conducted by switching the timing from emission of pump light to emission of probe light in a plurality of ways in order to examine chronological changes. PTL 1 discloses a configuration that changes an optical path length in order to change the emission timing. In addition, PTL2 discloses a configuration that controls the emission timing of laser beams by using a pulse picker.

CITATION LIST

Patent Literature

PTL 1: Japanese Patent Application Laid-Open (Kokai) Publication No. 2014-175442
PTL 2: Japanese Patent Application Laid-Open (Kokai) Publication No. 2013-032993

SUMMARY OF THE INVENTION

Problems to be Solved by the Invention

With the inventions described in PTL 1 and PTL 2, the configurations for switching the timing to output two pulse lasers are cumbersome and complicated.

Means to Solve the Problems

An optical output system according to a first aspect of the present invention includes: a first laser that outputs first light which is a pulse laser in response to input of a first signal; a second laser that outputs second light which is a pulse laser in response to input of a second signal; and an arithmetic unit that inputs the first signal and the second signal to the first laser and the second laser, wherein the arithmetic unit repeatedly inputs the first signal and the second signal with switching a variable delay value, which is a difference between a timing to input the first signal to the first laser and a timing to input the second signal to the second laser, in a plurality of ways.

A measuring system according to a second aspect of the present invention includes: the above-described optical output system; and a measurement system that performs pump-probe measurement of a sample by using at least part of the first light and at least part of the second light, which are output from the optical output system, as pump light and probe light.

An optical pump-probe scanning tunneling microscope system according to a third aspect of the present invention includes: the above-described optical output system; and an optical pump-probe scanning tunneling microscope that measures a sample by using at least part of the first light and at least part of the second light, which are output from the optical output system, as pump light and probe light.

An arithmetic unit according to a fourth aspect of the present invention used together with a first laser for outputting first light which is a pulse laser, in response to input of a first signal, and a second laser for outputting second light which is a pulse laser, in response to input of a second signal, the arithmetic unit includes: a signal generation unit that inputs the first signal and the second signal to the first laser and the second laser; a delay decision unit that repeatedly inputs the first signal and the second signal with switching a variable delay value, which is a difference between a timing to input the first signal to the first laser and a timing to input the second signal to the second laser, in a plurality of ways; and a signal output unit that outputs a reference signal indicating a timing when the variable delay value is changed.

A program according to a fifth aspect of the present invention for causing an arithmetic unit used together with a first laser for outputting first light which is a pulse laser in response to input of a first signal, and a second laser for outputting second light which is a pulse laser in response to input of a second signal, to execute: inputting the first signal and the second signal to the first laser and the second laser; repeatedly inputting the first signal and the second signal with switching a variable delay value, which is a difference between a timing to input the first signal to the first laser and a timing to input the second signal to the second laser, in a plurality of ways; and outputting a reference signal indicating a timing when the variable delay value is changed.

An optical output system according to a sixth aspect of the present invention includes: a first apparatus that outputs first light which is light pulses in a specified cycle; a second apparatus that outputs second light which is a pulse laser light in response to input of a signal; and an arithmetic unit that inputs the signal to the second apparatus with reference to a timing to output the first light, wherein the arithmetic unit repeatedly inputs the signal with switching a variable delay value, which is a difference between a timing to output the first light and a timing to input the signal to the second laser, in a plurality of ways.

Advantageous Effects of the Invention

According to the present invention, the timing to output two pulse lasers can be switched easily with a simple configuration.

BRIEF DESCRIPTION OF DRAWINGS

FIG. 12 is a diagram for explaining actions of the arithmetic unit 13 according to a sixth embodiment.

DESCRIPTION OF EMBODIMENTS

First Embodiment

A first embodiment of an OPP-STM (Optical Pump-Probe Scanning Tunneling Microscopy) will be explained below with reference to FIG. 1 to FIG. 7.

(System Configuration)

Figure 1:
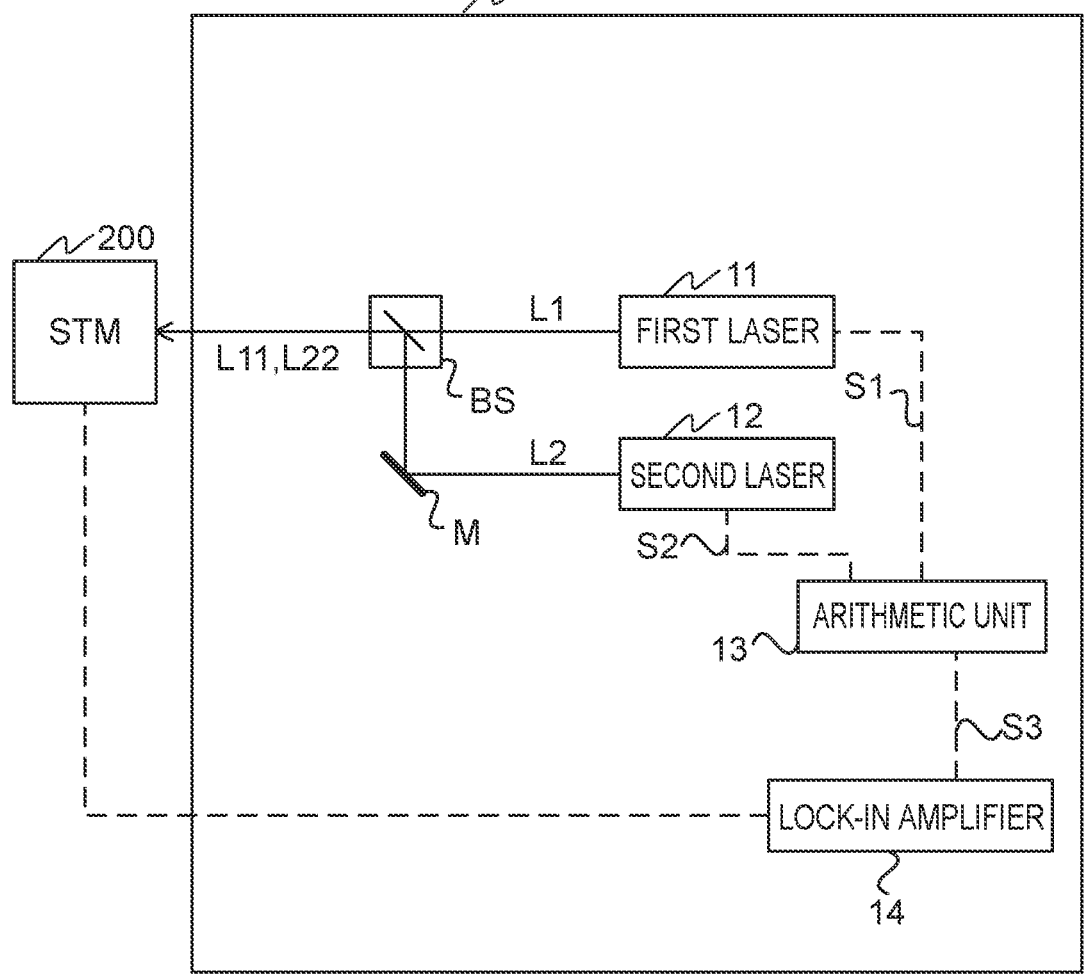
FIG. 1 is an overall configuration diagram of an optical pump-probe scanning tunneling microscope system 1 according to a first embodiment.

FIG. 1 is an overall configuration diagram of an OPP-STM 1 according to a first embodiment. In FIG. 1, light is indicated with a solid line and an electric signal is indicated with a broken line.

The OPP-STM 1 is composed of an optical output system 2 and an STM 200. The optical output system 2 includes a first laser 11, a second laser 12, an arithmetic unit 13, a lock-in amplifier 14, a mirror M, and a beam splitter BS.

The first laser 11 is a laser beam source that outputs first light L1 which is a laser beam. Once a pulse signal is input from the arithmetic unit 13, the first laser 11 outputs the first light L1 in a pulse state after first delay time. The second laser 12 is a laser beam source that outputs second light L2 which is a laser beam. Once a pulse signal is input from the arithmetic unit 13, the second laser 12 outputs the second light L2 in the pulse state after second delay time. The first delay time and the second delay time are very short periods of time which are substantially the same. The first delay time and the second delay time do not have to match each other in a strict sense and the difference between them is absorbed by adjustments described later.

The intensity of the first light L1 and the intensity of the second light L2 may be the same or different from each other. The first light L1 and the second light L2 may have the same pulse width or different pulse widths. Moreover, the pulse widths of the first light L1 and the second light L2 may be fixed values or be variable. If the pulse widths of the first light L1 and the second light L2 are variable, they may be changed by manually switching a switch included in the first laser 11 and the second laser 12 or may be changed according to the pulse width of the pulse signal which is input to the first laser 11 and the second laser 12.

The arithmetic unit 13 is a pulse signal generation apparatus and is configured by including a voltage generation source and an arithmetic operation unit. The arithmetic unit 13 is implemented by, for example, an FPGA (Field Programmable Gate Array) which is a rewritable logic circuit. The arithmetic unit 13 outputs a pulse signal to the first laser 11 and the second laser 12 and outputs a reference signal to the lock-in amplifier 14. A signal line connecting the arithmetic unit 13 and the first laser 11 will be referred to as S1; a signal line connecting the arithmetic unit 13 and the second laser 12 will be referred to as S2; a signal line connecting the arithmetic unit 13 and the lock-in amplifier 14 will be referred to as S3.

The lock-in amplifier 14: processes, as its processing target, a signal which is output by the STM 200; and detects a faint signal included in the output signal of the STM 200 based on the reference signal which is output by the arithmetic unit 13. The detected faint signal may be saved inside the lock-in amplifier 14 or may be saved in a storage apparatus outside the lock-in amplifier 14.

The mirror M is a planar mirror. The mirror M has a mechanism for adjusting its position and posture so that a split light L11 and a split light L22 which are output from the beam splitter BS can be adjusted coaxially. An operator makes the split light L11 and the split light L22 coaxial by adjusting the position and posture of the mirror M in advance while observing the split light L11 and the split light L22. Incidentally, instead of providing the mirror M with the mechanism for adjusting the position and posture, the first laser 11 and the second laser 12 may be provided with the mechanism for adjusting the position and posture. Incidentally, the split light L11 and the split light L22 will be hereinafter sometimes collectively referred to as "output light."

The beam splitter BS splits incident light into transmitted light and reflected light. Specifically speaking, the beam splitter BS splits the first light L1 into the split light L11 which is transmitted light, and the split light L12 which is reflected light; and splits the second light L2 into split light L21 which is transmitted light, and split light L22 which is reflected light. Incidentally, the beam splitter BS may be a so-called half mirror regarding which a ratio of the transmitted light intensity to the reflected light intensity is 1:1, and the ratio of the transmitted light intensity to the reflected light intensity may be other than the ratio mentioned above. In this embodiment, the split light L12 and the split light L21 are not utilized, so that they are not illustrated in the drawing.

Incidentally, the beam splitter BS may also include the mechanism for adjusting the position and posture so that the split light L11 and the split light L22 which are output from the beam splitter BS can be adjusted coaxially. Then, for example, the position may be adjusted by adjusting an angle of the mirror M and the angle may be adjusted by adjusting the angle of the beam splitter BS.

The STM 200 is a Scanning Tunneling Microscopy (STM) that uses the laser beams, which are output from the first laser 11 and the second laser 12, as pump light and probe light. The configuration of the STM 200 will be described later in detail, but the STM 200 outputs the detected signal to the lock-in amplifier 14.

The laser beam L1 which is output from the first laser 11 is split by the beam splitter BS into the split light L11 and the split light L12. The split light L11 which has transmitted through the beam splitter BS enters the STM 200. The laser beam L2 which is output from the second laser 12 is reflected by a plurality of mirrors M and is split by the beam splitter BS into the split light L21 and the split light L22. The split light L22 which has been reflected by the beam splitter BS enters the STM 200. Incidentally, the split light L11 will be also hereinafter sometimes referred to as "pump light" L11 and the split light L22 will be also hereinafter sometimes referred to as "probe light" L22.

(Configuration of STM)

Figure 2:
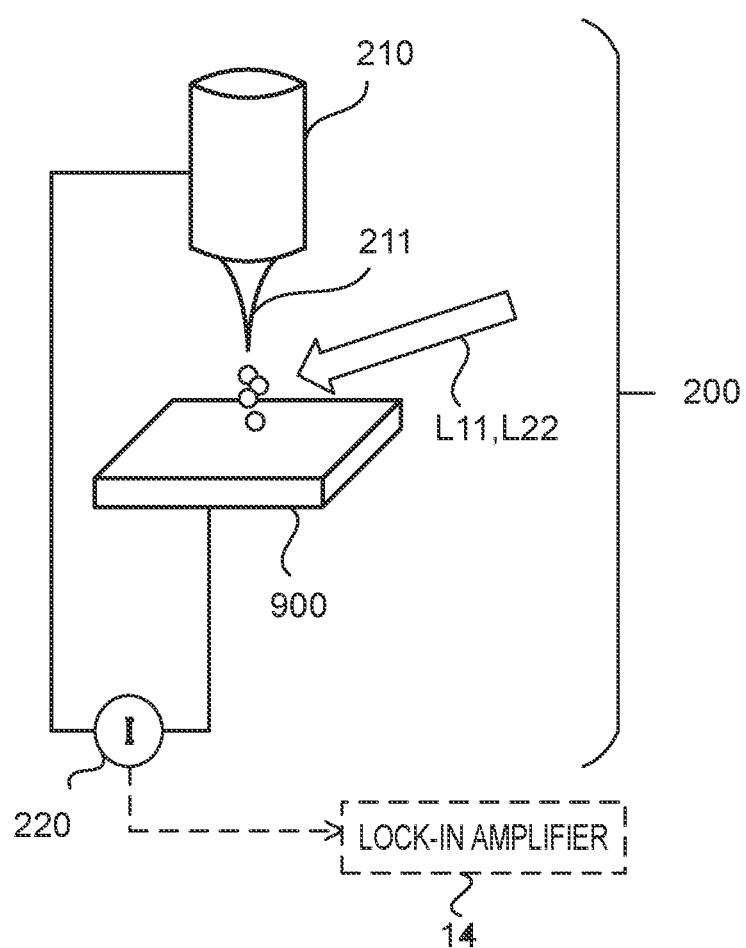
FIG. 2 is a schematic diagram of an STM 200.

FIG. 2 is a schematic diagram of the STM 200. The STM 200 includes a probe 210 and a tunnelling current detection unit 220. Incidentally, FIG. 2 also illustrates the lock-in amplifier 14, but it is not included in the configuration of the STM 200 and thereby indicated with a broken line. A sample 900 is set in the STM 200. The split light L11 and the split light L22 which are emitted from outside the STM 200 are emitted onto a surface of the sample 900 including a top end 211 of the probe 210. As the pump light L11 is emitted onto the sample 900, the sample 900 is excited; and the probe light L22 is emitted mainly while the sample 900 is excited.

The time differences to output the split light L11 and the split light L22 are set in a plurality of ways as described earlier; and, therefore, the probe light L22 may be emitted during the sample 900 is excited at least one time difference. The number of photocarriers excited by the probe light L22 changes depending on the delay time which is the difference between the timings when the two split light beams are emitted onto the sample 900; and a tunnelling current which flows between a probe tip 51a and the sample 900 changes and is detected by the tunnelling current detection unit 220. The tunnelling current detection unit 220 outputs a signal of the detected current to the lock-in amplifier 14.

(Functional Configuration of Arithmetic Unit)

Figure 3:
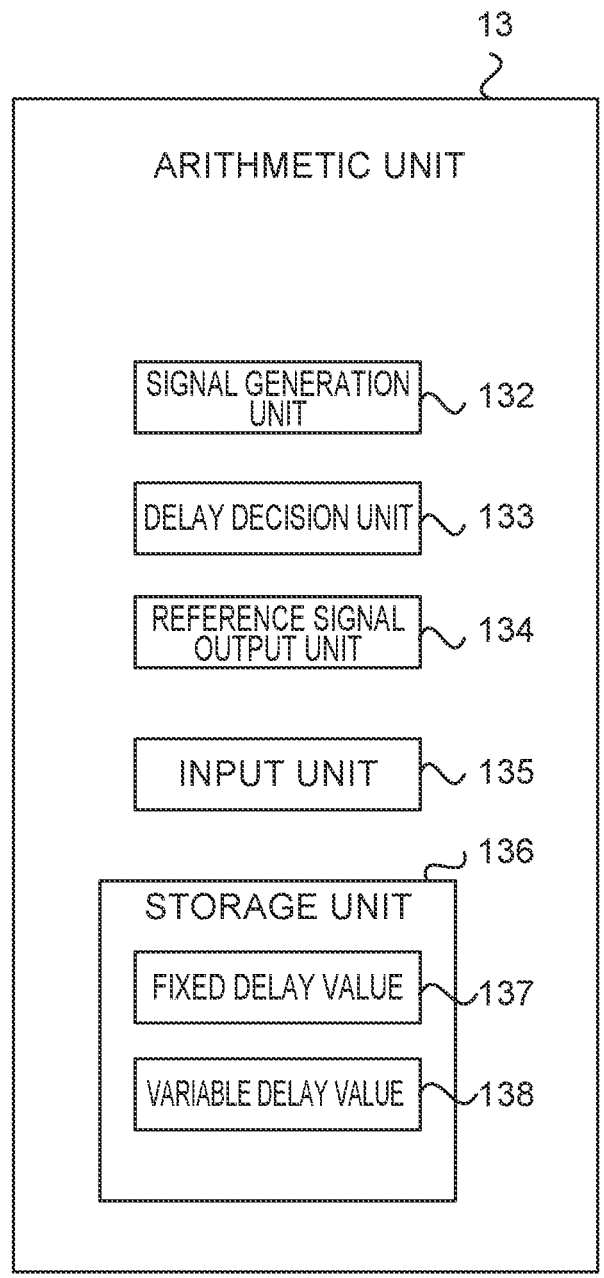
FIG. 3 is a functional block diagram of an arithmetic unit 13.

FIG. 3 is a functional block diagram illustrating the respective functions of the arithmetic unit 13 as functional blocks. The arithmetic unit 13 is implemented by an FPGA as explained earlier. When the FPGA is activated, the FPGA reads logic circuit information from an ROM (which is not illustrated in the drawing) and writes it into the FPGA. As a result of this writing of the information, a signal generation unit 132, a delay decision unit 133, a reference signal output unit 134, an input unit 135, and a storage unit 136 are formed. The delay decision unit 133 decides the value of a variable delay value 138 described later. The signal generation unit 132 includes a delay time count unit and a voltage generation source capable of generating a voltage in a pulse state. The reference signal output unit 134 includes a voltage generation source capable of generating a voltage signal.

The input unit 135 includes a physical interface such as a button for accepting the user's command, or an electric interface for accepting the user's command via an electric signal. The storage unit 136 stores a fixed delay value 137 and a variable delay value 138. However, values of the fixed delay value 137 and the variable delay value 138 do not have to be stored in the ROM which is not illustrated in the drawing; and in that case, every time the arithmetic unit 13 is activated, the user inputs the values of the fixed delay value 137 and the variable delay value 138 via the input unit 135.

The signal generation unit 132 outputs a pulse signal to the first laser 11 and the second laser 12. The delay decision unit 133 decides the variable delay value 138. The input unit 135 writes the value of the fixed delay value 137 to the storage unit 136 on the basis of the input by the user. A delay value, that is, a time interval between the output of the pulse signal from the signal generation unit 132 to the first laser 11 and the output of the pulse signal to the second laser 12 is the sum of the fixed delay value 137 and the variable delay value 138. The fixed delay value 137 is to cancel any influences of optical path lengths, signal cable lengths, and individual differences between the first laser 11 and the second laser 12; and by setting an appropriate value as the fixed delay value 137, the timings for the pump light L11 and the probe light L22 to reach the sample 900 can be made simultaneous when the variable delay value is zero. The variable delay value 138 is a value for setting the difference between the timings for the pump light L11 and the probe light L22 to reach the sample 900. Incidentally, the variable delay value 138 will be hereinafter also referred to as a "time difference $\Delta t$."

(Example of Output Light)

Figure 4:
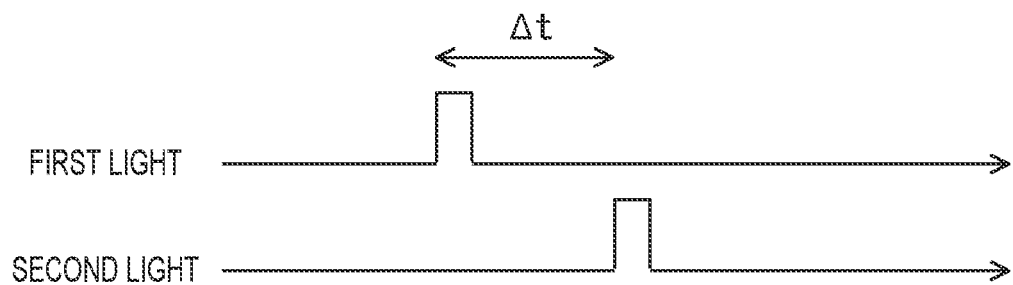
FIG. 4 is a diagram illustrating an example of output light.

FIG. 4 is a diagram illustrating an example of temporal changes of light intensity of the split light L11 and the split light L22 at the position of the sample 900. Referring to FIG. 4, the time elapses from the left side to the right side of the drawing; and in the example illustrated in FIG. 4, the first light L11 reached the sample 900 first and then the second light L22 reached the sample 900. In this embodiment, it is defined as indicated in FIG. 4 that the time difference $\Delta t$ is a positive value when the first light L11 reaches the sample 900 first.

(Measured Signal)

The outline of a measured signal of the STM 200 will be explained in order to help the understanding of actions of the arithmetic unit 13 before explaining the actions of the arithmetic unit 13. However, the following explanation will be provided to explain representative measurement results when the STM 200 performs measurement by using a certain sample as a measurement target; and it is not presupposed as a prerequisite for the OPP-STM 1 that it has a similar tendency regardless of the type of the sample.

Figure 5:
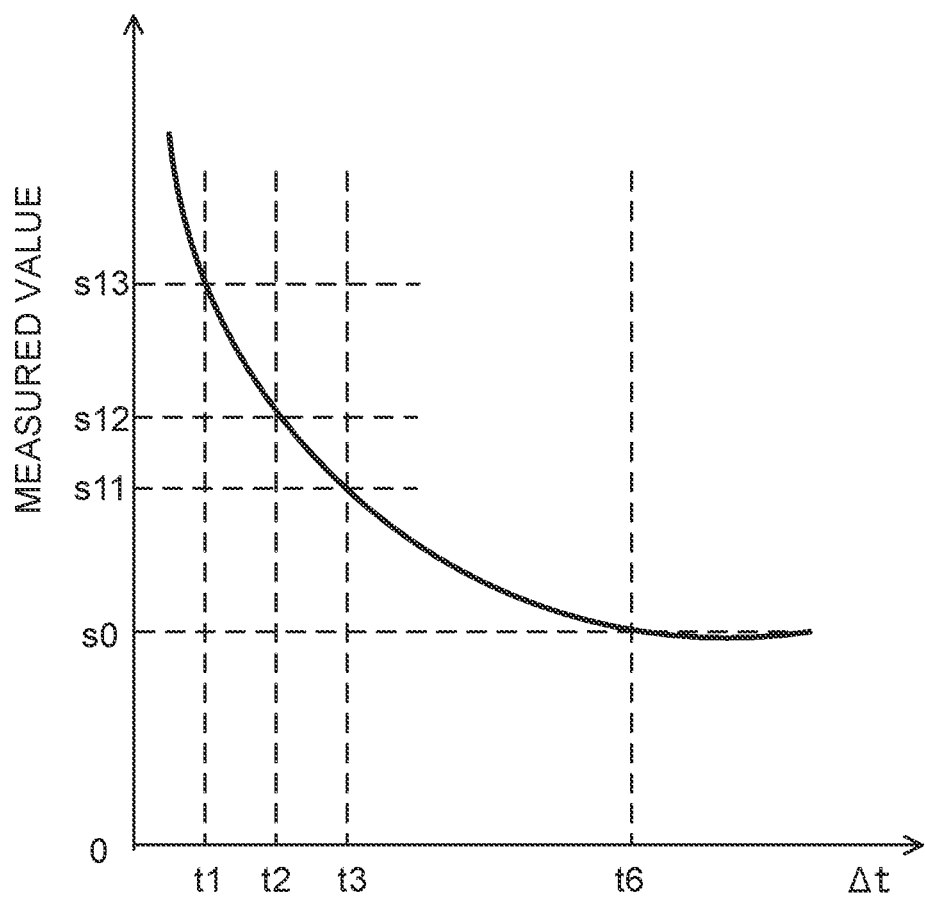
FIG. 5 is a diagram illustrating the relationship between an output signal of the STM 200 and a time difference Δt.

FIG. 5 is a diagram illustrating the relationship between an output signal of the STM 200 and the time difference $\Delta t$. The sample 900 is excited by the emission of the pump light L11 and the excitation decays along the passage of time. For example, if there is a relationship of t1<t2<t3, measured values when the time differences $\Delta t$ are t1, t2, t3 are s13, s12, and s11 and are in the relationship of s13>s12>s11. As the time difference $\Delta t$ becomes larger, the measured signal decreases; and if the time difference $\Delta t$ is equal to or larger than a certain value, for example, if the time difference $\Delta t$ is equal to or larger than t6 in the example illustrated in FIG. 5, the measured signal converges to s0 which is the minimum value in this measurement.

However, the difference in signal level between s0 and s13 is smaller than the minimum value as the measurement signal, that is, the difference in signal level between "0" on the vertical axis of FIG. 5 and the minimum measurement value s0. Specifically, since the SN ratio in this measurement is very small, the normal measurement is difficult, therefore, the lock-in amplifier 14 is used. The problem of the low SN ratio is solved by periodically switching the delay time $\Delta t$ and using the lock-in amplifier 14 synchronously with that period, thereby evaluating the measured values such as s13, s12, and s11 not in comparison with zero, but in comparison with s0.

Incidentally, the example illustrated in FIG. 5 is merely an outline and the values of t6 and s0 are actually not clear before the measurement, so that, for example, a sufficiently long period of time such as the amount of time several times as long as an estimated decay time is often widely used instead of t6. In this embodiment, the sufficiently long period of time will be explained as t9. Furthermore, in this embodiment, the values such as s0 and s11 as indicated in FIG. 5 cannot be measured directly and a value relative to s0 as a reference, that is, a value of "s13−s0" and a value of "s12−s0" are obtained.

(Measured Signal)

Figure 6:
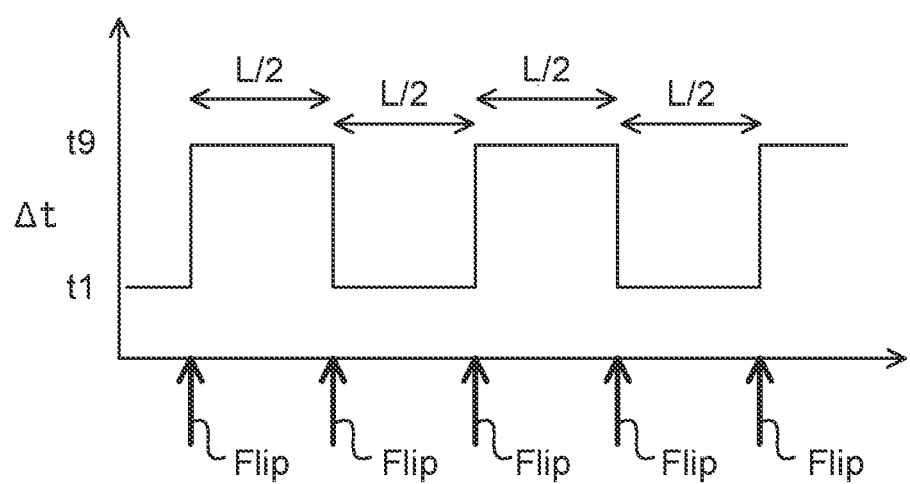
FIG. 6 is a diagram illustrating actions of an arithmetic unit 13 to obtain one certain measured value.

FIG. 6 is a diagram illustrating the actions of the arithmetic unit 13 in order to obtain s13 which is referenced to s0, that is, "s13−s0." Referring to FIG. 6, time passes from the left side to the right side of the drawing and the vertical axis indicates the time difference $\Delta t$. Arrows Flip indicated in a lower part of FIG. 6 indicate timings for the reference signal, which is output by the arithmetic unit 13 to the lock-in amplifier 14, to invert. In the example illustrated in FIG. 6, assuming that a modulation period is L, the arithmetic unit 13 switches the time difference Δt between t1 and t9 every specified period of time L/2 which is a half of L. During the specified period of time L/2, the pump light L11 and the probe light L22 are output multiple times, for example, a few dozen times or hundreds of times.

The reason why the difference between the timings for the pump light L11 and the probe light L22 to reach the sample 900 becomes equal to the variable delay value 138, that is, the time difference Δt, will be explained below. The signal generation unit 132 firstly outputs a pulse signal to the first laser 11 and then outputs a pulse signal to the second laser 12 after a time period of sum of the fixed delay value 137 and the variable delay value 138 has elapsed from the output to the first laser 11. Since the difference between duration from when the first laser 11 and the second laser 12 receive the pulse signals to when they output light pulses, and the time difference the light pass through optical path from the first laser 11 and the second laser 12 to the sample 900 are equal to the fixed delay value 137, the difference between the timings for the pump light L11 and the probe light L22 to reach the sample 900 becomes exactly equal to the variable delay value 138, that is, the time difference Δt. Incidentally, the signal generation unit 132 measures the elapse of time by counting the number of oscillations of, for example, a built-in oscillator. In other words, in this embodiment, the fixed delay value 137 and the variable delay value 138 can be controlled based on oscillation periods of the oscillator as units.

For example, the arithmetic unit 13: sets the time difference Δt as t9 and outputs the pump light L11 and the probe light L22 one hundred times in time periods of L/2, and then sets the time difference Δt as t1 and outputs the output light one hundred times in time periods of L/2. The arithmetic unit 13 implements cyclic changes of Δt as illustrated in FIG. 6 by repeating the above-described actions a plurality of number of times. For example, the arithmetic unit outputs −1V as the reference signal for the time periods of L/2 when setting Δt as t9 and outputs 1V as the reference signal for the time periods of L/2 when setting Δt as t1, thereby causing the lock-in amplifier 14 to perform lock-in detection in synchronization with the delay time changes. The output from the STM 200 oscillates between S0 and S13 with period L in accordance with the changes in the delay time. "S13-S0" which is the difference between S0 and S13 can be measured at a high SN ratio from the output of the lock-in amplifier which operates in synchronization with the reference signal.

(Flowchart)

Figure 7:
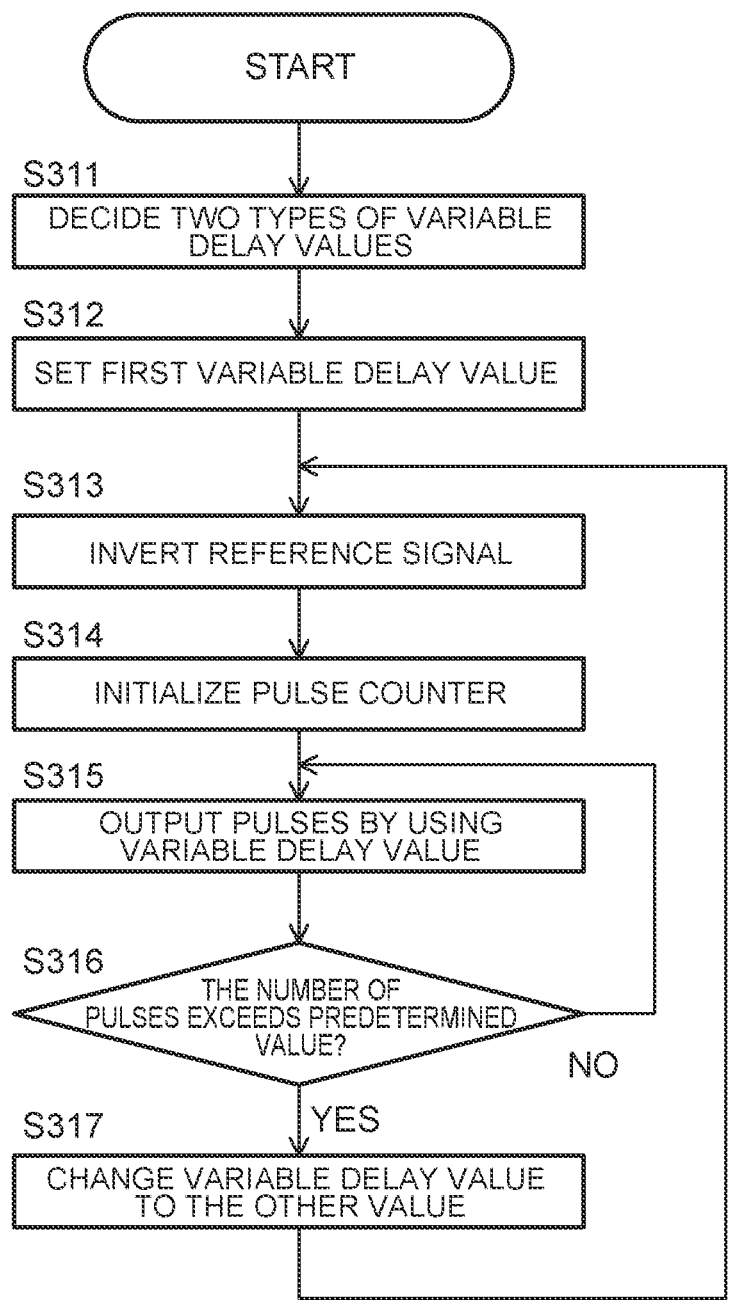
FIG. 7 is a flowchart illustrating actions of the arithmetic unit 13.

FIG. 7 is a flowchart illustrating actions of the arithmetic unit 13. Incidentally, the arithmetic unit 13 is implemented by the FPGA in this embodiment, so that the flowchart illustrated in FIG. 7 does not necessarily precisely illustrate the actions of hardware. For example, practically, a counter circuit which counts the number of pulses, a circuit which generates electric pulses when the counter is a specific value, and so on always operate independently and in parallel to each other and their inputs and outputs are connected to each other. In this embodiment, the actions of the arithmetic unit 13 will be explained by using the flowchart for the sake of convenience.

Regarding the respective steps explained below, S313 is executed by the reference signal output unit 134, S315 is executed by the signal generation unit 132, and other steps are executed by the delay decision unit 133. In S311, the arithmetic unit 13 firstly decides two variable delay values 138 which change in a cyclic manner. These variable delay values 138 may be stored in the storage unit 136 in advance or the user may input the variable delay value(s) 138 from the input unit 135 every time the processing is executed. In the subsequent step S312, the arithmetic unit 13 sets either one of the two kinds of the variable delay value 138, which were set in S311, as the variable delay value 138 to be used and then proceeds to S313.

In S313, the arithmetic unit 13 inverts the reference signal which is output to the lock-in amplifier 14. For example, if the reference signal immediately before the execution of S313 was "−1V," the reference signal is changed to "+1V" in S313. In the next step S314, the arithmetic unit 13 initializes a pulse counter which counts the number of pulses to zero. In the subsequent step S315, the arithmetic unit 13 causes the signal generation unit 132 to output a pulse signal to the first laser 11 and the second laser 12 by using the variable delay value 138 which is currently set. In the subsequent step S316, the arithmetic unit 13 increases the number of counts of the pulse counter by one and judges whether the number of counts of the pulse counter has reached a specified control value, for example, 100 or not. If the arithmetic unit 13 determines that the number of counts of the pulse counter has reached the specified count, in other words, if the arithmetic unit 13 determines that the time L/2 has elapsed since the execution of S314, the processing proceeds to S317; and if the arithmetic unit 13 determines that the number of counts of the pulse counter has reached not the specified number of counts, the processing returns to S315.

In S317, the arithmetic unit 13 changes the variable delay value 138 to the other value, which is not the currently set value, among the two types of the variable delay values 138 decided in S311, and then the processing returns to S313. Incidentally, in S317, the arithmetic unit 13 further judges whether the number of times of processing has reached a specified number of times or not; and if the arithmetic unit 13 determines that the number of times of processing has reached the specified number of times, the processing may return to S311 and continue measuring two types of different variable delay values or terminate the processing illustrated in FIG. 7.

The following operational advantages can be obtained according to the above-described first embodiment.

(1) The optical output system 2 includes: the first laser 11 that outputs the first light L1, which is a pulse laser, according to an input signal; the second laser 12 that outputs the second light L2, which is a pulse laser, according to an input signal; and the arithmetic unit 13 which inputs a signal to the first laser 11 and the second laser 12. The arithmetic unit 13 switches the variable delay value 138, which is the difference between the timing to input the signal to the first laser 11 and the timing to input the signal to the second laser 12, in a plurality of ways. Therefore, it is possible to switch between the timings for the first laser 11 and the second laser 12 to output the pulse laser by means of a simple configuration.

Meanwhile, a means of changing the optical path length in the conventional technologies requires mechanical actions such as movements of a stage or driving the mirror, which causes problems such that the occurrence of vibrations cannot be avoided and a switching speed has physical limits. There is a known configuration that utilizes a Pockels cells in order to improve these problems. However, although the Pockels cells can improve the above-described two problems, problems remain such that the light cannot be completely blocked and the apparatus configuration becomes large.

The problem of incapability to block the light completely means that weak light leaks out at a timing when the light should be blocked. In other words, the weak light will be always emitted, which will cause unintended influences on measured values. The problem of the apparatus configuration required to be on the extensive scale means that since delay time resolving power which can be set solely by the Pockels cell is limited by repeated periods (up to 10 ns) of the source laser, and if the delay time resolving power which is lower than that is required, a mechanism for controlling the pulse output timings of the two lasers is separately required. If the control becomes cumbersome and complicated, the scale of the apparatus becomes extensive and the installment area and required cost of the apparatus also become large.

However, the optical output system 2 can freely set the delay time by controlling the timing to input the electric signal to the first laser 11 and the second laser 12, so that problems like those of the means for changing the optical path length or the means for using the Pockels cell will not occur. Specifically speaking, the optical output system 2 has advantages of no vibrations, no limits on the switching speed, no emission of unnecessary faint light pulses between the pulses, and the simple apparatus configuration and the small installment area.

(2) The arithmetic unit 13 includes the reference signal output unit 134 that changes the variable delay value 138 in two ways in the specified period L and outputs the reference signal indicating the timings to change the variable delay value. Consequently, on the premise of the use of the lock-in amplifier 14, it is possible to acquire necessary information from the faint signal which is output from the STM 200.

(3) The optical output system 2 includes the lock-in amplifier 14 that processes, as a processing target, the output of the STM 200 using the first light L1 and the second light L2 and performs the lock-in detection based on the reference signal. Consequently, it is possible to acquire necessary information from the faint signal which is output from the STM 200.

(4) The optical output system 2 includes the beam splitter BS that coaxially outputs at least part of the first light L1 and at least part of the second light L2 as output light. Regarding the outputs of the optical output system 2, if the first light L1 and the second light L2 had different optical axes, these beams of light would have to be made coaxial depending on the measurement system to be used; however, both the beams of light which are the outputs of the optical output system 2 are coaxial, so that they have the advantage of easy usability.

(5) The optical pump-probe scanning tunneling microscope system 1 includes: the optical output system 2; and the STM 200 that utilizes part of the first light L1 and part of the second light L2, which are output from the optical output system 2, as the pump light L11 and the probe light L22. Consequently, the STM having the time resolution function with the simple configuration can be used.

(Variation 1)

In the aforementioned first embodiment, the arithmetic unit 13 is implemented by the FPGA. However, at least part of the arithmetic unit 13 may be implemented by a combination of a CPU which is a central processing unit instead of the FPGA, a ROM which is a read-only storage area, and a RAM which is a writable/readable storage area. In this case, a program(s) which is stored in the ROM is extracted to the RAM and executed. Moreover, the arithmetic unit 13 may be implemented by an ASIC (Application Specific Integrated Circuit), which is an application specific integrated circuit, instead of the FPGA. Furthermore, the arithmetic unit 13 may be implemented by a combination of different configurations, for example, a combination of the CPU, the ROM, the RAM, and the FPGA.

In other words, a program described below is also included within the scope of the present invention.

(6) The program which is executed by the arithmetic unit 13 which is used together with the first laser 11 and the second laser 12 executes the following: to input the signal to the first laser 11 and the second laser 12; to switch the variable delay value 138, which is the difference between the timing to input the signal to the first laser 11 and the timing to input the signal to the second laser 12, in a plurality of ways; and to output the reference signal which indicates the timing to change the variable delay value 138.

Furthermore, the present invention also includes a program for the FPGA circuit which enables the same actions as those of the above-mentioned program.

(Variation 2)

The optical output system 2 does not have to include the lock-in amplifier 14. In this case, the arithmetic unit 13 does not output a pulse signal to the lock-in amplifier 14.

(Variation 3)

The lock-in amplifier 14 may exist outside the optical output system 2. In this case, the arithmetic unit 13 outputs a pulse signal to the lock-in amplifier 14 which exists outside the optical output system 2.

(Variation 4)

The measurement apparatus which is used in combination with the optical output system 2 is not limited to the STM 200. Any measurement apparatus may be used as long as it performs pump-probe measurements.

(Variation 5)

The configuration of the optical output system 2 illustrated in FIG. 1 includes only one mirror M. However, the optical output system 2 may include a plurality of mirrors M in order to enhance the degree of freedom such as arrangement and adjustments. Furthermore, in this case, the first laser 11, the beam splitter BS, the second laser 12, and the plurality of mirrors M may be located so that the optical path length from the first laser 11 to the beam splitter BS and the optical path length from the second laser 12 to the beam splitter BS can be adjusted.

(Variation 6)

The arithmetic unit 13 may include an input interface to enabling the user to input and adjust the fixed delay value 137. For example, the arithmetic unit 13 may include a volume switch so that the user may increase or decrease the fixed delay value 137 in accordance with a turning direction and a turning amount of the volume switch.

Second Embodiment

A second embodiment of the optical pump-probe scanning tunneling microscope system will be explained with reference to FIG. 8. In the following explanation, differences from the first embodiment will be mainly explained by assigning the same reference numerals to the same components as those in the first embodiment. Matters which are not particularly explained are the same as those in the first embodiment. In this embodiment, the main difference from the first embodiment is that the optical output system independently outputs two laser beams and the two laser beams are made coaxial outside the optical output system.

Figure 8:
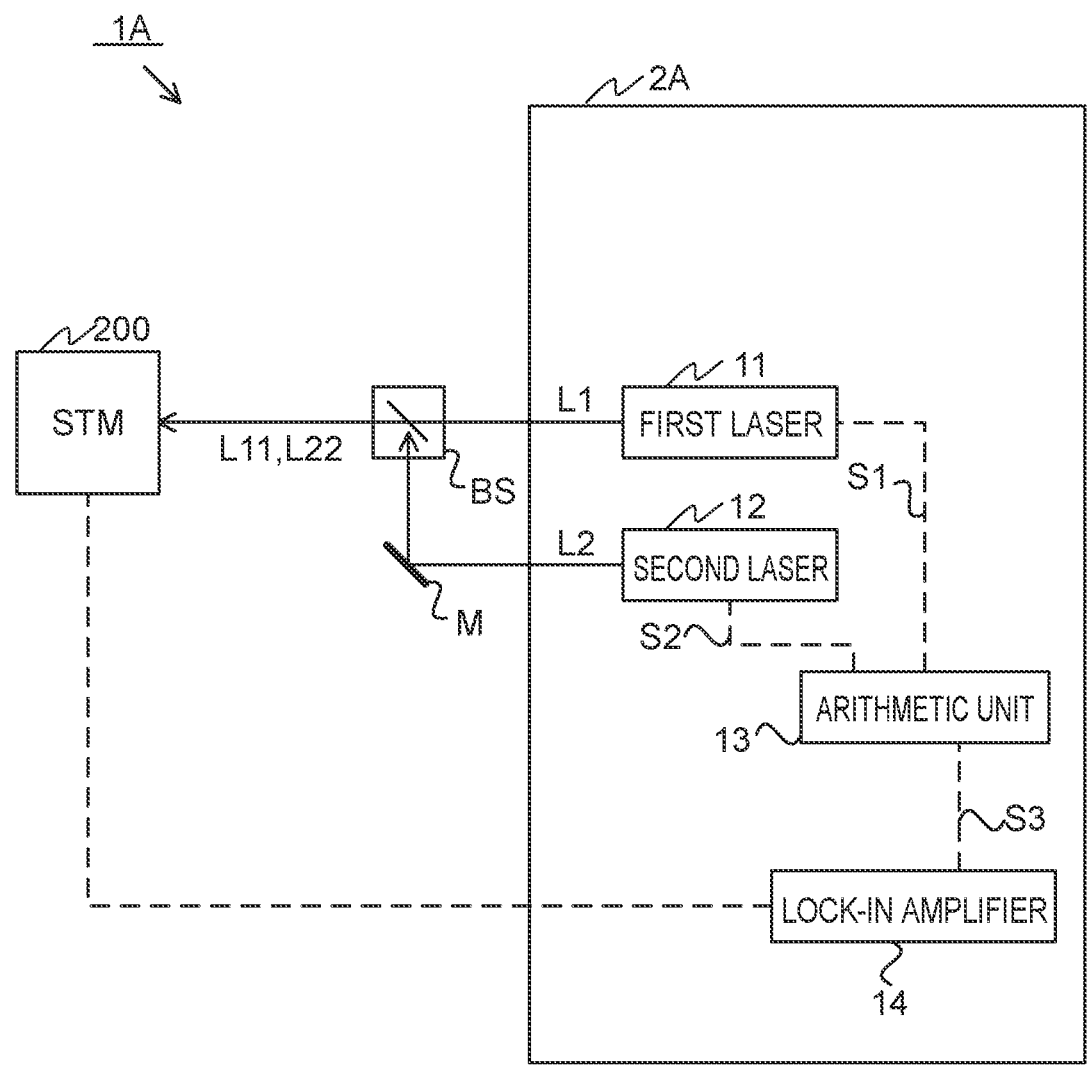
FIG. 8 is an overall configuration diagram of an optical pump-probe scanning tunneling microscope system 1A according to a second embodiment.

FIG. 8 is an overall configuration diagram of an optical pump-probe scanning tunneling microscope system 1A according to the second embodiment. The difference from the first embodiment is that the mirror M and the beam splitter BS are not included in the optical output system 2A. Other configurations are similar to those of the first embodiment.

The above-described second embodiment is useful for a case where the measurement apparatus which is combined with the optical output system 2A performs pump-probe measurements based on light which is not coaxial. Furthermore, even when performing the pump-probe measurements based on coaxial light, operational advantages similar to those of the first embodiment can be obtained by using the mirror M and the beam splitter BS in the same manner as in the first embodiment.

Third Embodiment

A third embodiment of the optical pump-probe scanning tunneling microscope system will be explained with reference to FIG. 9. In the following explanation, differences from the first embodiment will be mainly explained by assigning the same reference numerals to the same components as those in the first embodiment. Matters which are not particularly explained are the same as those in the first embodiment. In this embodiment, the main difference from the first embodiment is that the optical output system outputs two laser beams without making them coaxial.

Figure 9:
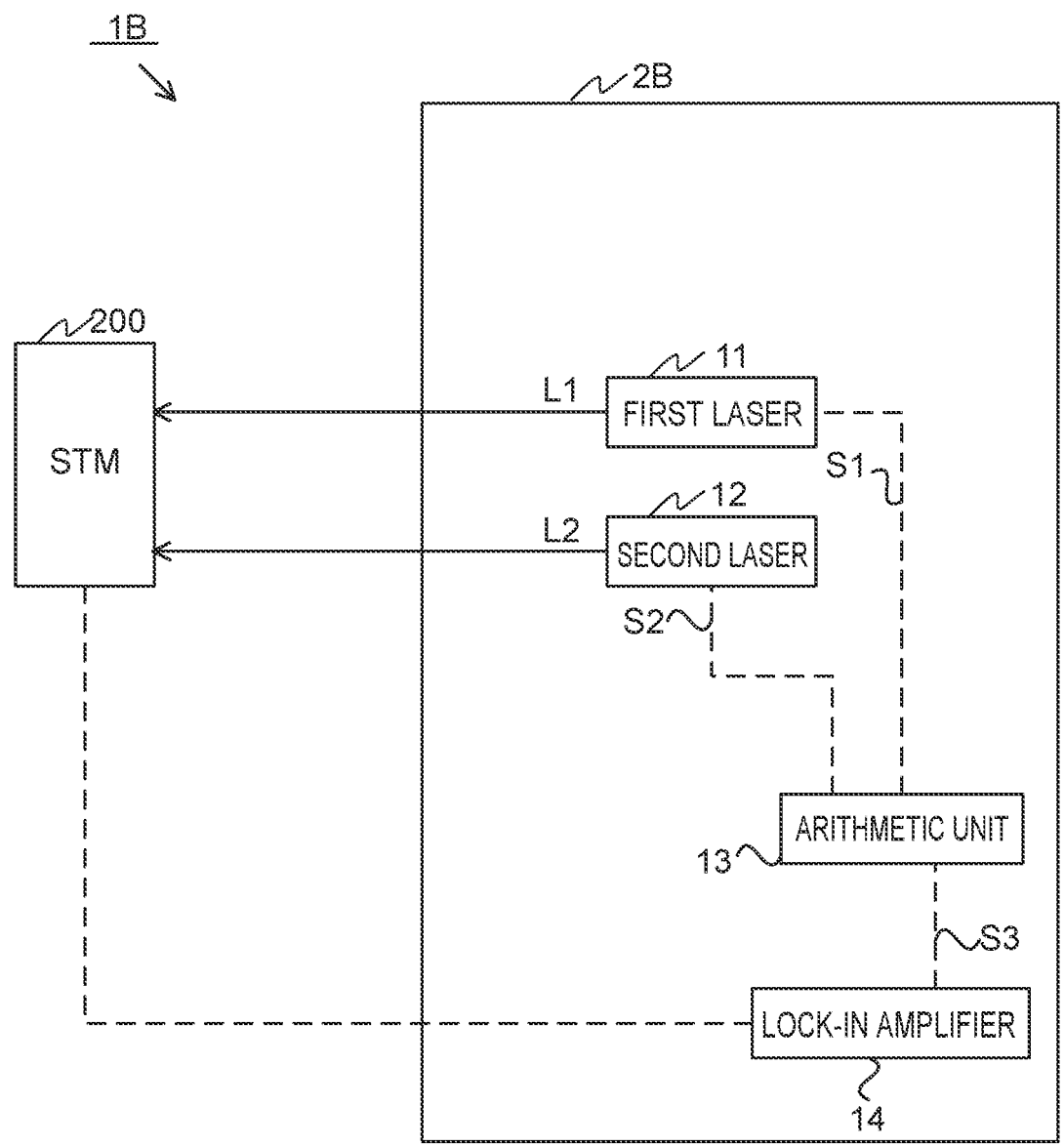
FIG. 9 is an overall configuration diagram of an optical pump-probe scanning tunneling microscope system 1B according to a third embodiment.

FIG. 9 is an overall configuration diagram of an optical pump-probe scanning tunneling microscope system 1B according to the third embodiment. The difference from the first embodiment is that the beam splitter and the mirror are not included. In other words, in this embodiment, the output light L1 and the output light L2 are directly input to the STM 200.

The above-described third embodiment is useful for a case where the measurement apparatus which is combined with the optical output system 2A performs pump-probe measurements based on light which is not coaxial.

Fourth Embodiment

A fourth embodiment of the optical pump-probe scanning tunneling microscope system will be explained with reference to FIG. 10. In the following explanation, differences from the first embodiment will be mainly explained by assigning the same reference numerals to the same components as those in the first embodiment. Matters which are not particularly explained are the same as those in the first embodiment. In this embodiment, the main difference from the first embodiment is that the time difference $\Delta t$ can be controlled with high accuracy.

In the above-described first embodiment, the duration of oscillations of the oscillator included in the arithmetic unit 133 is sufficiently short as compared to the required accuracy of the time measurement. However, if the condition of the sufficiently short duration of the oscillations of the oscillator included in the arithmetic unit 13 as compared to the required accuracy of the time measurement is not satisfied, it is effective to also use an analogue delay circuit explained below.

Figure 10:
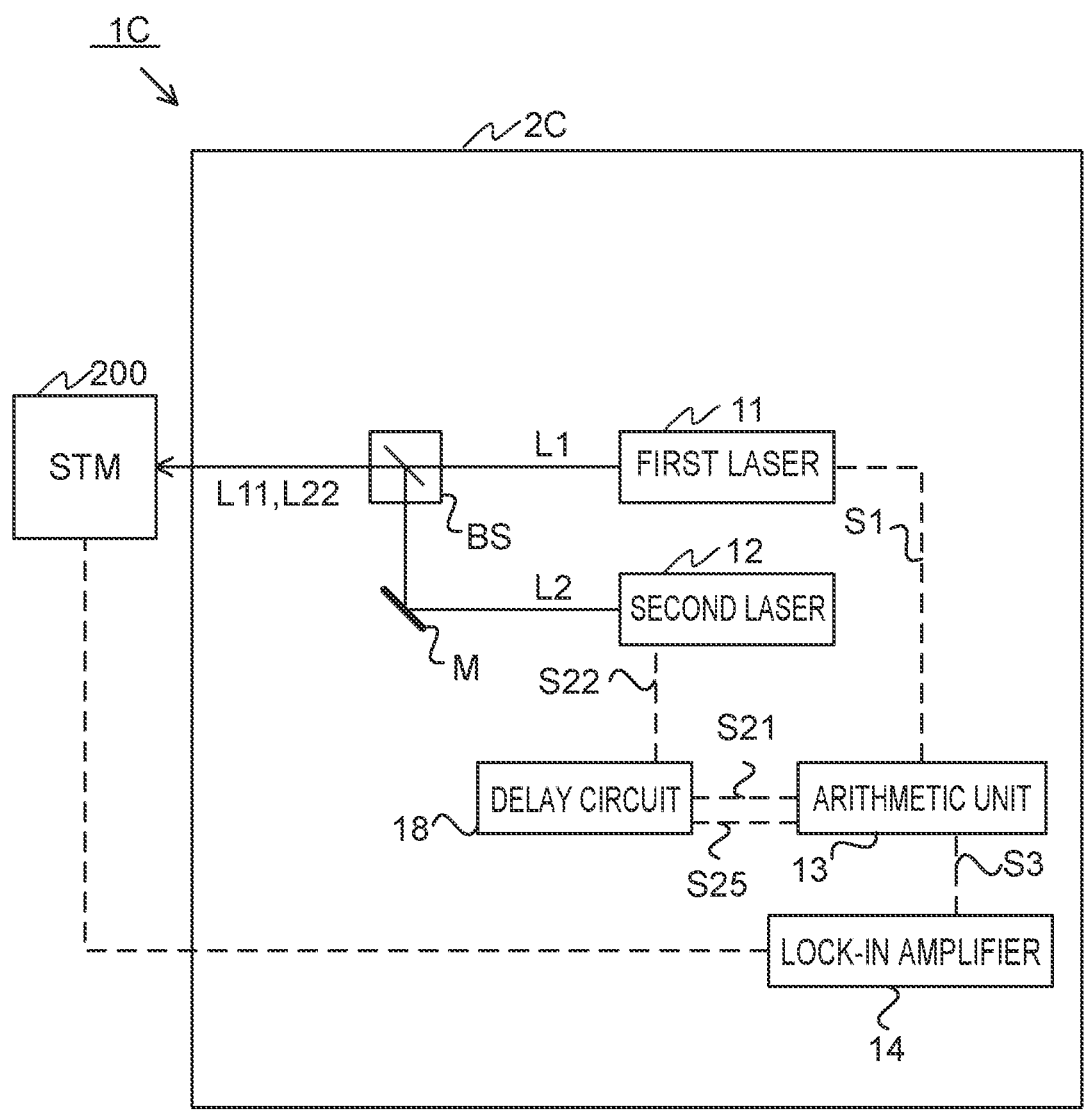
FIG. 10 is an overall configuration diagram of an optical pump-probe scanning tunneling microscope system 1C according to a fourth embodiment.

FIG. 10 is an overall configuration diagram of an optical pump-probe scanning tunneling microscope system 10 according to the fourth embodiment. The optical pump-probe scanning tunneling microscope system 10 includes an optical output system 2C and the STM 200. The difference between the optical output system 2C and the optical output system 2 is that the optical output system 2C further includes a delay circuit 18. In this embodiment, the pulse signal from the arithmetic unit 13 to the second laser 12 is output via the delay circuit 18.

Delay time of the delay circuit 18 can be adjusted by a control signal from the arithmetic unit 13 via S25. The delay circuit 18 can adjust the delay time, for example, on a ps basis. After the pulse signal is input via S21 from the arithmetic unit 13, the delay circuit 18 outputs the pulse signal via S22 to the second laser 12 after being delayed by the delay time which is set according to properties of the analog circuit.

According to the above-described fourth embodiment, the time difference $\Delta t$ can be controlled with higher accuracy. For example, if the frequency of the oscillator included in the arithmetic unit 13 is 1 GHz, one period is 1 ns and, therefore, it is impossible to implement the control on the ps basis, where ps is a period of time less than one period. However, based on the delay circuit 18, the time difference $\Delta t$ can be controlled with a time resolution shorter than one period of the oscillator included in the arithmetic unit 13.

(Variation of Fourth Embodiment)

The delay circuit 18 may be configured by being integrated with the arithmetic unit 13. For example, by using an FPGA equipped with an output delay circuit, the arithmetic unit 13 in which the delay circuit 18 is built can be implemented.

Fifth Embodiment

A fifth embodiment of the optical pump-probe scanning tunneling microscope system will be explained with reference to FIG. 11. In the following explanation, differences from the first embodiment will be mainly explained by assigning the same reference numerals to the same components as those in the first embodiment. Matters which are not particularly explained are the same as those in the first embodiment. In this embodiment, the main difference from the first embodiment is that the first laser continuously outputs laser pulses in a specific period without having a signal input from outside.

Figure 11:
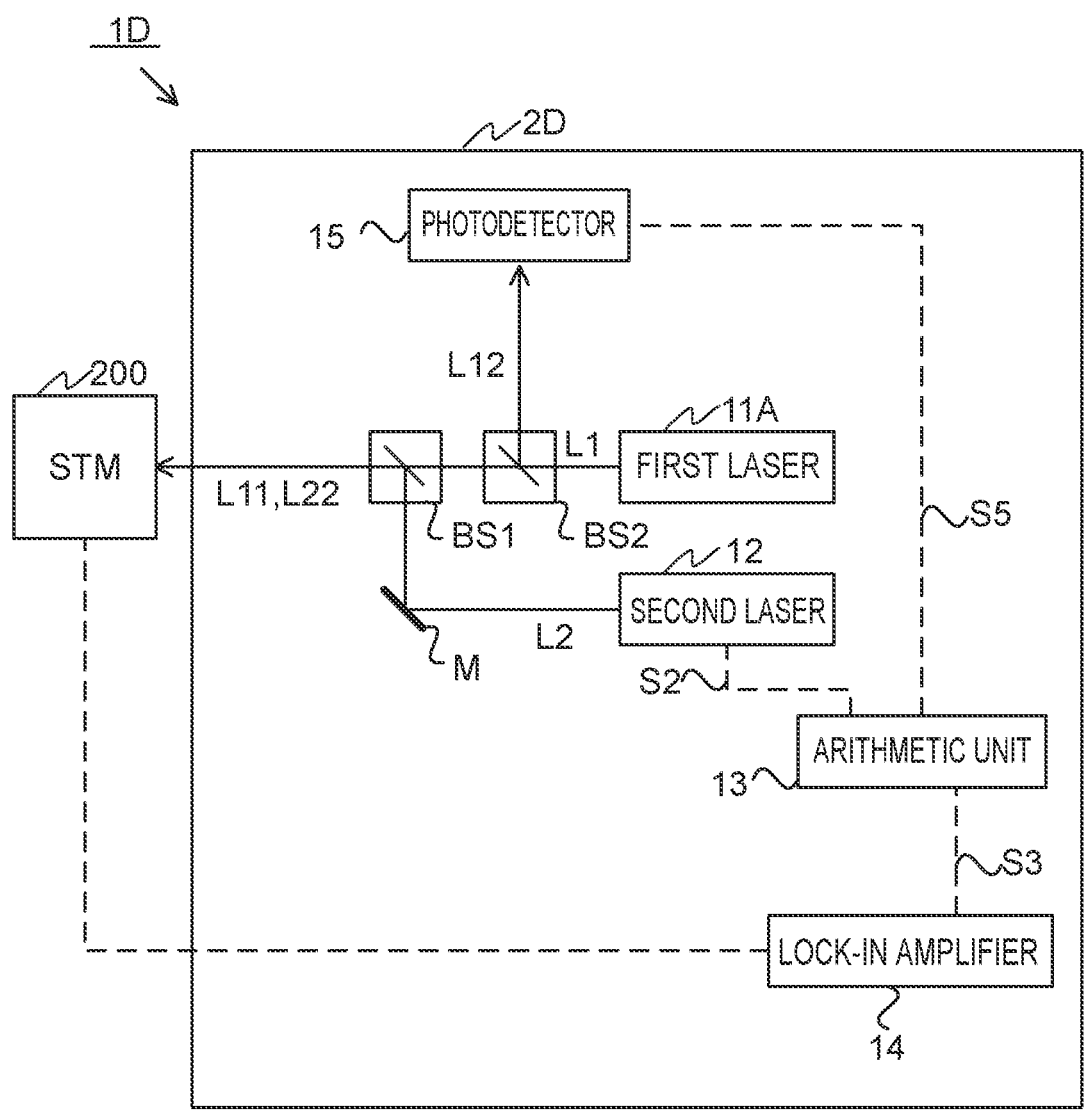
FIG. 11 is an overall configuration diagram of an optical pump-probe scanning tunneling microscope system 1D according to a fifth embodiment.

FIG. 11 is an overall configuration diagram of an optical pump-probe scanning tunneling microscope system 1D according to the fifth embodiment. Differences from the first embodiment are that: a first laser 11A which operates independently instead of the first laser 11 is included; two beam splitters BS1 and BS2 for splitting the first light L1 which is output from the first laser 11A is included; and a photodetector 15 that detects the output of the first laser 11A is included. Also, the actions of the arithmetic unit 13 are different from those of the first embodiment.

The frequency of the first laser 11A to output the pulse laser is known and is, for example, 100 kHz. However, this frequency is not necessarily strict and at least complete synchronization with the oscillator which is built in the arithmetic unit 13 cannot be expected.

The photodetector 15 transforms the received light into an electric signal and outputs the electric signal. The photodetector 15 may be implemented by using a photo multiplier or may be implemented by using a photodiode which utilizes a p-n junction of a semiconductor. The split light L12 which is part of the first light L1 output by the first laser 11 is input to the photodetector 15. The photodetector 15 outputs the electric signal, which has been transformed from the received light, as a synchronization signal S5 to the arithmetic unit 13.

The arithmetic unit 13 generates a clock that is several hundred to several thousand times larger than the first laser using the synchronization signal S5 as the reference timing and uses it to count the variable delay 138. For example, if the output of the first laser 11A is 100 kHz, the arithmetic unit 13 generates 100-MHz clocks and counts the variable delay value 138 with reference to the reception time of the synchronization signal S5.

The following operational advantage can be obtained according to the abovementioned fifth embodiment.

(7) An optical output system 2D includes: the first laser 11A that outputs the first light L1 which is light pulses in a specified period; the second laser 12 that outputs the second light which is a pulse laser according to an input signal; and the arithmetic unit 13 that inputs a signal to the second laser 12 with reference to the timing to output the first light L1. The arithmetic unit 13 switches the variable delay value 138, which is the difference between the timing to output the first light L1 and the timing to input the signal to the second laser 12, in a plurality of ways. Consequently, operational advantages similar to those of the first embodiment can be obtained by using a laser oscillator which has been conventionally used and outputs laser beams in a specified period. Since the output of the second laser 12 or the like which outputs the pulse laser according to the input pulse signal is not necessarily high, the configuration of this embodiment has a further advantage of the capability to use the high-output laser oscillator.

(Variation of Fifth Embodiment)

The output of the first apparatus 1011 may be other than a laser. For example, the first apparatus 1011 may be a synchrotron and output X-ray pulses in a specified period.

Sixth Embodiment

A sixth embodiment of the optical pump-probe scanning tunneling microscope system will be explained with reference to FIG. 12. In the following explanation, differences from the first embodiment will be mainly explained by assigning the same reference numerals to the same components as those in the first embodiment. Matters which are not particularly explained are the same as those in the first embodiment. In this embodiment, the main difference from the first embodiment is that the timing for the signal generation unit 132 to output the electric signal is specified.

A hardware configuration of the optical pump-probe scanning tunneling microscope system according to the sixth embodiment is similar to that of the first embodiment, so that an explanation about it is omitted. A functional configuration of the optical pump-probe scanning tunneling microscope system according to the sixth embodiment is similar to that of the first embodiment, except the details of the implementation of the signal generation unit 132. Actions of the signal generation unit 132 and the arithmetic unit 13 including the signal generation unit 132 will be explained.

FIG. 12 is a diagram for explaining actions of the arithmetic unit 13 according to the sixth embodiment. FIG. 12(*a*) is a diagram illustrating the actions of the arithmetic unit 13 according to the sixth embodiment; FIG. 12(*b*) is a diagram illustrating a reference signal; and FIG. 12(*c*) is a diagram illustrating actions of a comparative example. Incidentally, in FIG. 12(*a*) to FIG. 12(*c*), time axes in a horizontal direction in the drawing are synchronized with each other. In the example illustrated in FIG. 12, for the sake of convenience of the illustration, each of the first light L1 and the second light L2 is output three times in average during a time period of L/2 which is a half of the time period of a modulation period. T101, T102, T103, and so on indicated in FIG. 12 are the timing when the length of L/2 is divided by N, for example, the length of L/2 is divided by three in the example illustrated in FIG. 12, with reference to a starting timing of the modulation period L. Each of these timings such as T101 and T102 will be referred to as a "reference timing."

In this embodiment, the signal generation unit 132 makes the time difference between the first light L1 and the second light L2 to reach the sample 900 to be set as the variable delay value 138 by shifting the first light L1 ahead of each reference timing such as T101 and T102 by just a half of the value of the variable delay value 138 and shifting the second light L2 later than the reference timing by just a half of the value of the variable delay value 138 as illustrated in FIG. 12(*a*). For example, if the variable delay value 138 is t1, the signal is output to the first laser 11 and the second laser 12 so that the first light L1 reaches the sample earlier than the reference timing only by t1/2 and the second light L2 reaches the sample later than the reference timing only by t1/2. Also, if the variable delay value 138 is t9, the signal is output to the first laser 11 and the second laser 12 so that L1 reaches the sample earlier than the reference timing only by t9/2 and L2 reaches the sample later than the reference timing only by t912. On the other hand, in the comparative example illustrated in FIG. 12(*c*), the signal generation unit 132 makes the time difference for the first light L1 and the second light L2 to reach the sample 900 to be set as the variable delay value 138 by operating so that the first light L1 always reaches the sample at the reference timing and the second light L2 reaches the sample later than the reference timing only by the amount of the variable delay value 138.

The difference between FIG. 12(*a*) and FIG. 12(*c*) becomes significant around the time(s) of day to switch the variable delay value. In FIG. 12(*a*), the density in a time direction of the total number of light pulses of the first light L1 and the second light L2 around the time of switching is substantially constant and there is no sparse or dense density in terms of time. However, in the comparative example, while the density in the time direction of the number of light pulses of the first light L1 is completely constant regardless of the timings, regarding the second light L2 the light emitted toward the sample 900 becomes sparse in terms of time around T104 and the light emitted toward the sample 900 becomes dense in terms of time around T107. Consequently, in the comparative example, the output of the STM 200 may possibly include not only the influence caused by changing the variable delay value 138 every half period of the modulation period L, but also the influence caused by the sparse or dense density of the emitted light, which occurs every half period, in terms of time. On the other hand, in this embodiment, the density of the light emitted toward the sample 900 hardly becomes sparse or dense even around the time of the modulation, so that this embodiment has the advantage of the capability to easily measure the influence of the variable delay value 138.

The following operational advantage can be obtained according to the abovementioned sixth embodiment.

(8) The signal generation unit 132 outputs the signal to the first laser 11 and the second laser 12 so that the average timing for the first light L1 to reach the sample 900 and the timing for the second light L2 to reach the sample 900 will match the reference timing which is referenced to the modulation timing of the reference signal. Consequently, the density of the light emitted toward the sample 900 hardly becomes sparse or dense even around the time of any change of the variable delay value 138 and the influence on the variable delay value 138 can be easily measured.

The aforementioned embodiments and variations may be combined with each other. Various embodiments and variations have been described above; however, the present invention is not limited to the content of these embodiments and variations. Other aspects which can be thought of within the scope of the technical idea of the present invention are also included within the scope of the present invention.

Incidentally, the disclosure content of the following basic priority application is incorporated herein by reference: Japanese Patent Application No. 2018-233878 (filed on Dec. 13, 2018).

REFERENCE SIGNS LIST 1, 1A, 1B, 1C, 1D: optical pump-probe scanning tunneling microscope system
2, 2A: optical output system
3: arithmetic unit
11: first laser
12: second laser
13: arithmetic unit
14: lock-in amplifier
15: photodetector
131: adjustment unit
132: signal generation unit
133: delay decision unit
134: reference signal output unit
135: input unit
136: storage unit
137: fixed delay value
138: variable delay value
900: sample
L1: first light
L11: pump light
L2: second light
L22: probe light

The invention claimed is:

1. An optical output system comprising:
a first laser that outputs first light which is a pulse laser in response to input of a first signal;
a second laser that outputs second light which is a pulse laser in response to input of a second signal; and
an arithmetic unit that is configured
to generate pulse signals including a first signal and a second signal, and to input the first signal and the second signal to the first laser and the second laser, and
to decide a variable delay value, which is a difference between a timing to input the first signal to the first laser and a timing to input the second signal to the second laser,
wherein the arithmetic unit repeatedly inputs the first signal and the second signal with switching the variable delay value in a plurality of ways,
wherein the arithmetic unit changes the variable delay value between two values with a specified periodicity; and
wherein the optical output system further comprises a reference signal output unit that outputs a reference signal indicating a timing when the variable delay value is changed.

2. The optical output system according to claim 1, further comprising a lock-in amplifier that performs lock-in detection of an output of a measurement system that uses the first light and the second light, based on the reference signal.

3. The optical output system according to claim 1, further comprising an optical system that outputs at least part of the first light and at least part of the second light coaxially as output light.

4. A measuring system comprising:
the optical output system according to claim 1; and
a measurement system that performs pump-probe measurement of a sample by using at least part of the first light and at least part of the second light, which are output from the optical output system, as pump light and probe light.

5. The measuring system according to claim 4, wherein the arithmetic unit outputs the first signal and the second signal to the first laser and the second laser so that an average time of a timing when at least part of the first light reaches a sample and a timing when the second light reaches the sample matches a reference time which refers to a timing when the variable delay value is changed, which is indicated by the reference signal.

6. An optical pump-probe scanning tunneling microscope system comprising:
the optical output system according to claim 1; and
an optical pump-probe scanning tunneling microscope that measures a sample by using at least part of the first light and at least part of the second light, which are output from the optical output system, as pump light and probe light.

7. The optical pump-probe scanning tunneling microscope system according to claim 6,
wherein the arithmetic unit outputs the first signal and the second signal to the first laser and the second laser so that an average time of a timing when at least part of the first light reaches a sample and a timing when the second light reaches the sample matches a reference time which refers to a timing when the variable delay value is changed, which is indicated by the reference signal.

8. An arithmetic unit used together with a first laser for outputting first light which is a pulse laser, in response to input of a first signal, and a second laser for outputting second light which is a pulse laser, in response to input of a second signal, wherein
the arithmetic unit is configured
to input the first signal and the second signal to the first laser and the second laser;
to decide a variable delay value, which is a difference between a timing to input the first signal to the first laser and a timing to input the second signal to the second laser, and
repeatedly to input the first signal and the second signal with switching the variable delay in a plurality of ways; and
the arithmetic unit comprises a signal output unit that outputs a reference signal indicating a timing when the variable delay value is changed.

9. An arithmetic operation method executed by an arithmetic unit that is configured to generate first and second signals, the arithmetic unit being used together with a first laser for outputting first light which is a pulse laser in response to input of the first signal, and a second laser for outputting second light which is a pulse laser in response to input of the second signal, the arithmetic operation method comprising:

inputting the first signal and the second signal to the first laser and the second laser;

repeatedly inputting the first signal and the second signal with switching a variable delay value decided by the arithmetic unit, which is a difference between a timing to input the first signal to the first laser and a timing to input the second signal to the second laser, in a plurality of ways; and outputting a reference signal indicating a timing when the variable delay value is changed.

10. A measuring system comprising:

the optical output system according to claim 1; and a measurement system that performs pump-probe measurement of a sample by using at least part of the first light and at least part of the second light, which are output from the optical output system, as pump light and probe light.

11. A measuring system comprising:

the optical output system according to claim 2; and a measurement system that performs pump-probe measurement of a sample by using at least part of the first light and at least part of the second light, which are output from the optical output system, as pump light and probe light.

12. A measuring system comprising:

the optical output system according to claim 3; and a measurement system that performs pump-probe measurement of a sample by using at least part of the first light and at least part of the second light, which are output from the optical output system, as pump light and probe light.

13. The measuring system according to claim 11, wherein the arithmetic unit outputs the first signal and the second signal to the first laser and the second laser so that an average time of a timing when at least part of the first light reaches a sample and a timing when the second light reaches the sample matches a reference time which refers to a timing when the variable delay value is changed, which is indicated by the reference signal.

14. An optical pump-probe scanning tunneling microscope system comprising:

the optical output system according to claim 1; and an optical pump-probe scanning tunneling microscope that measures a sample by using at least part of the first light and at least part of the second light, which are output from the optical output system, as pump light and probe light.

15. An optical pump-probe scanning tunneling microscope system comprising:

the optical output system according to claim 2; and an optical pump-probe scanning tunneling microscope that measures a sample by using at least part of the first light and at least part of the second light, which are output from the optical output system, as pump light and probe light.

16. An optical pump-probe scanning tunneling microscope system comprising:

the optical output system according to claim 3; and an optical pump-probe scanning tunneling microscope that measures a sample by using at least part of the first light and at least part of the second light, which are output from the optical output system, as pump light and probe light.

17. The optical pump-probe scanning tunneling microscope system according to claim 15, wherein the arithmetic unit outputs the first signal and the second signal to the first laser and the second laser so that an average time of a timing when at least part of the first light reaches a sample and a timing when the second light reaches the sample matches a reference time which refers to a timing when the variable delay value is changed, which is indicated by the reference signal.

18. The optical output system according to claim 1, wherein the arithmetic unit is a field programmable gate array, which is a logic circuit.

19. The optical output system according to claim 1, wherein the arithmetic unit is an application specific integrated circuit, which is a logic circuit.

20. The optical output system according to claim 1, wherein the arithmetic unit consists of at least a processor and a memory storing a program, and the program is executed by the processor to generate the pulse signals, to input the first signal and the second signal to the first laser and the second laser, to repeatedly input the first signal and the second signal with switching the variable delay value, and to change the variable delay value between two values with the specified periodicity.

* * * * *